United States Patent
Lucas et al.

(10) Patent No.: US 6,786,594 B1
(45) Date of Patent: Sep. 7, 2004

(54) HINGE FOR EYEWEAR

(75) Inventors: Ian Lucas, Hong Kong Gardens (HK); Robert-Anton Baumgartner, Traun (AT)

(73) Assignee: Fore-Z (H.K.) Limited, Kowloon (HK)

( * ) Notice: Subject to any disclaimer, the term of this patent is extended or adjusted under 35 U.S.C. 154(b) by 0 days.

(21) Appl. No.: 10/387,588

(22) Filed: Mar. 14, 2003

(51) Int. Cl.$^7$ ................................................ G02C 5/22
(52) U.S. Cl. .................... 351/153; 351/110; 16/228
(58) Field of Search ............................. 351/110, 153, 351/63; 16/228

(56) References Cited

U.S. PATENT DOCUMENTS

| | | | |
|---|---|---|---|
| 5,847,800 A | * | 12/1998 | Tachibana .................... 351/110 |
| 6,068,375 A | * | 5/2000 | LeBrun et al. ............... 351/113 |
| 6,428,166 B2 | * | 8/2002 | Tiberghien ................... 351/153 |
| 6,530,660 B1 | * | 3/2003 | Chao et al. .................... 351/63 |
| 6,540,350 B2 | * | 4/2003 | Fujita .......................... 351/110 |

FOREIGN PATENT DOCUMENTS

| | | |
|---|---|---|
| EP | 0656557 A1 | 6/1995 |
| FR | 2751431 | 1/1998 |
| GB | 2168499 A | 6/1986 |
| WO | 02/061495 A1 | 8/2002 |
| WO | 03/021335 A1 | 3/2003 |

* cited by examiner

*Primary Examiner*—Huy Mai
(74) *Attorney, Agent, or Firm*—Burns, Doane, Swecker & Mathis, L.L.P.

(57) ABSTRACT

An item of eyewear such as spectacles or sunglasses comprises two lenses and two rearwardly extending temple members, and each temple member is pivotally mounted for movement between in-use and non-use positions by means of a hinge provided in an aperture formed in a side of a respective lens. The temple members pivot through 180° degrees when moving between their in-use and non-use positions, and furthermore the pivot axis of the hinge is generally horizontal.

6 Claims, 3 Drawing Sheets

HINGE FOR EYEWEAR

FIELD OF THE INVENTION

This invention relates to a hinge for an item of eyewear such as spectacles, sunglass and the like, and in particular to such a hinge that may be used with frameless spectacles and the like. It should be noted here that while in the remainder of this specification the term "spectacles" will be used for convenience and simplicity, the invention should not be construed as being limited to spectacles for correcting vision, but can be applied equally to other types of eyewear such as sunglasses and protective eyewear.

BACKGROUND OF THE INVENTION

Traditionally, spectacles are formed with a frame for the lenses. This frame may be made of any suitably strong and preferably lightweight material such as plastics or a strong light metal such as aluminum or titanium. In addition to holding the lenses in the correct relative position, the frame is also used to mount the nosepieces that allow the spectacles to rest on the nose of a wearer, and also for the mounting of the rearwardly extending temples that engage and rest over the cars of a wearer.

As is well-known, the temples of the spectacles are normally movable between an extended operative or in-use position in which they ire approximately parallel to engage the ears when the spectacles are being worn, and a folded non-operative or non-use position for when the spectacles are not being worn. In the folded position the temples are moved so that they generally overlie the rear faces of the spectacles leases. In this position the spectacles occupy a minimum space when not in use and can, for example, be placed in a small case.

PRIOR ART

To allow the temples to move between their operative and non-operative positions, the temples are hinge mounted. Where the spectacles are provided with a frame, a projection is formed extending from the frame at each end and to which the ends of the temples are attached through a hinge structure. Conventionally the hinge is formed with an axis of rotation that extends substantially vertically when the spectacles are being worn, and can also be considered as being substantially parallel to the plane of the lenses (subject to the qualification that the lenses will be curved and therefore the plane of the lenses is an inevitable approximation).

Where a frame is provided for the lenses, providing the hinge mounting for the temples presents no difficulty. However, it is increasingly preferred to form spectacles without any frame. Frameless spectacles are increasingly preferred for aesthetic reasons and to reduce the weight of the spectacles, but when there is no frame the hinge mounting of the temples becomes problematic.

The conventional approach to the hinge mounting of the temples in frameless spectacles is to attach a hinge mounting directly to the lens using a securing pin that extends through the lens. With such a structure the hinge is arranged in the same manner as with spectacles having a frame, that is to say the hinge axis is substantially vertical when the spectacles are being worn. The problem with this conventional approach to the hinge mounting of the temples in frameless spectacles is that the securing pin must pass through the lens, and to avoid any danger of the lens fracturing the pin is often inserted through the lens at a distance of around 5 mm from the edge of the lens. This is both aesthetically unappealing, and also reduces the area of the lens that can be seen through by the wearer.

SUMMARY OF THE INVENTION

According to the present invention there is provided an item of eyewear comprising two lenses and two rearwardly extending temple members, wherein each said temple member is pivotally mounted for movement between in-use and non-use positions by means of a hinge provided in an aperture formed in a side of a respective said lens.

In a preferred arrangement, the hinge provides rotation about a hinge axis that is horizontal when the item of eyewear is being worn by a user, and which provides rotation about a hinge axis that extends substantially perpendicularly to the surface of the lens in the region of said hinge.

Preferably each temple rotates about said hinge through 180° when moving between said in-use and non-use positions. Means may be provided to fix die hinge in the aperture against rotation thereof. Preferably for example the aperture comprises a first circular portion and two sloping edges connecting the circular portion to the edge of the lens, and the hinge includes a mounting portion a central section thereof having a circular cross-section of the same diameter as the circular portion of the aperture, and the mounting portion farther including sloping surfaces complementary to the sloping surfaces of the aperture whereby rotation of the mounting portion in the aperture is prevented.

Viewed from another broad aspect the present invention provides an item of eyewear comprising two lenses and two rearwardly extending temple members, wherein each said temple member is pivotally mounted for movement between in-use and non-use positions, and wherein each said temple member rotates through 180° between said in-use and non-use positions.

Viewed from a still further broad aspect the present invention also provides an item of eyewear comprising two lenses and two rearwardly extending temple members, wherein each said temple member is pivotally mounted for movement between in-use and non-use positions by means of a hinge defining a hinge axis that extends substantially perpendicularly to the surface of the lens in the region of said hinge.

BRIEF DESCRIPTION OF THE DRAWINGS

An embodiment of the invention will now be described by way of example and with reference to the accompanying drawings, in which.

DETAILED DESCRIPTION OF PREFERRED EMBODIMENT

Figure 1:
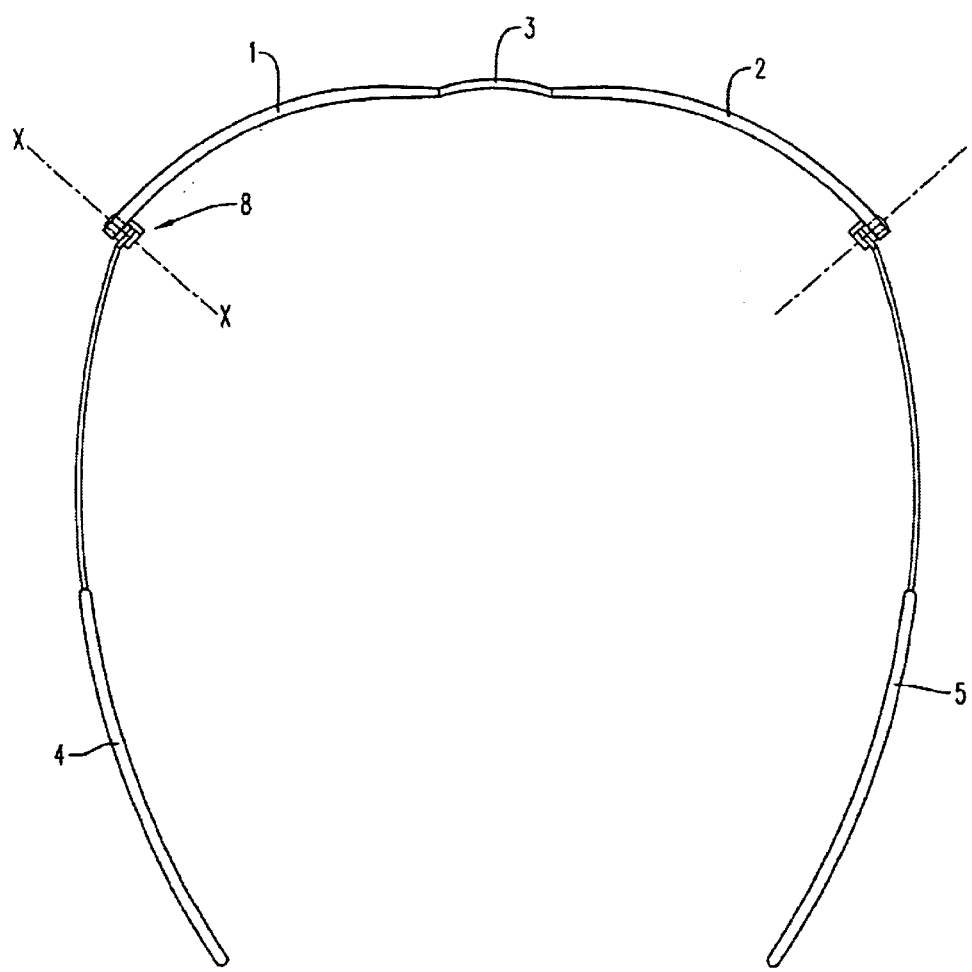
FIG. 1 is a plan view of a pair of spectacles formed with hinges according to an embodiment of the present invention and showing the temples in the operative position reader for wear.
Figure 2:
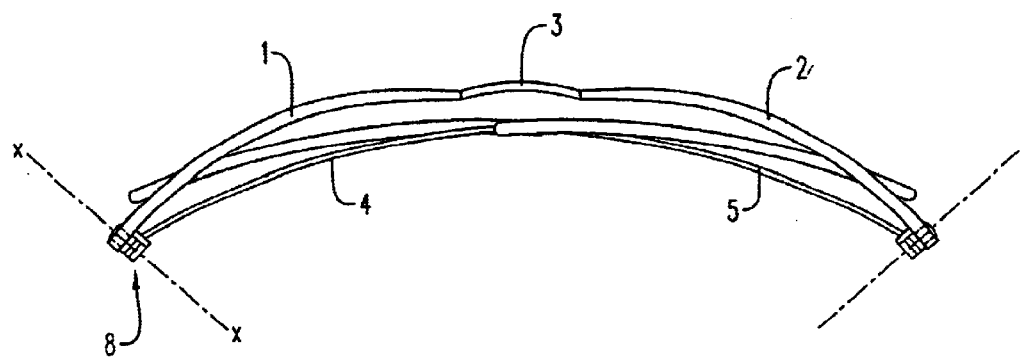
FIG. 2 is a view similar to FIG. 1 but showing the temples in a non-operative position.

Referring firstly to FIGS. 1 and 2 it will be seen that a pair of spectacles comprises left and right lenses 1, 2 connected by a bridge member 3, and left and right temple members 4,5 that extend from the outside edges of lenses 1,2 and which extend rearwardly so that they can engage and hook over the cars of a wearer to hold the spectacles in place in conjunction with conventional nosepieces (not shown).

It will be understood that the two temple members 4,5 are symmetrical and identical and only one temple member will be described in the following, it being understood that the other temple member is identical.

Left temple member 4 is Fixed directly to the left lens 1 through a hinge 8 which is fitted in a notch-like aperture formed in the side of the lens 1. The structure of the hinge 8, will be described in more detail below, but from FIGS. 1 and 2 it should be noted that the hinge 8 has an axis of rotation X—X that extends substantially perpendicularly from the surface of the lens where the hinge is located, and which when the spectacles are being worn by a user will lie in a substantially horizontal plane. As can be seen from FIGS. 1 and 2, the temple is capable of pivoting about the hinge axis X—X between the operative position shown in FIG. 1 where the spectacles are ready for wear, and the non-operative position shown in FIG. 2 where the spectacles may be stored away in a spectacles case.

It should be noted that the hinge is fitted directly in the side of the lens without the need for any separate hinge mounting structure. The aperture for receiving the hinge need have a depth of only about 3 mm and so the part of the lens occupied by the hinge is substantially lens than for a conventional frameless hinge mounting arrangement. The result is both more aesthetically pleasing and minimizes the extent to which a wearer's vision may be obscured by the hinge.

Figure 3:
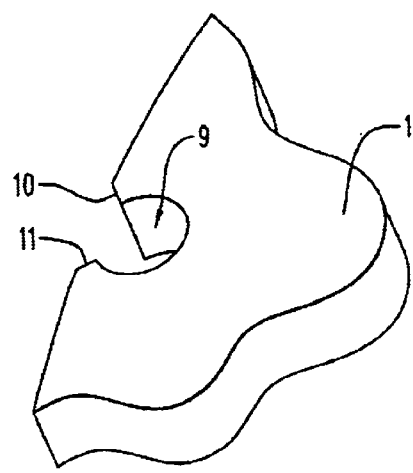
FIG. 3 is a perspective view of a part of the edge of one lens showing the hinge receiving aperture.
Figure 4C:
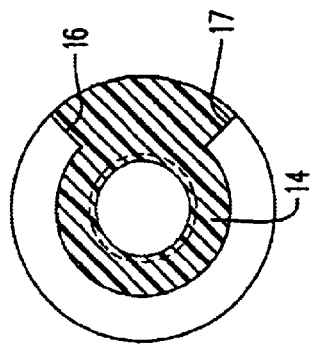
FIGS. 4(a)–(c) are (a) end, (b) side and (c) sectional along line A—A views of a hinge adapted to fit in the aperture of FIG. 3.
Figure 4B:
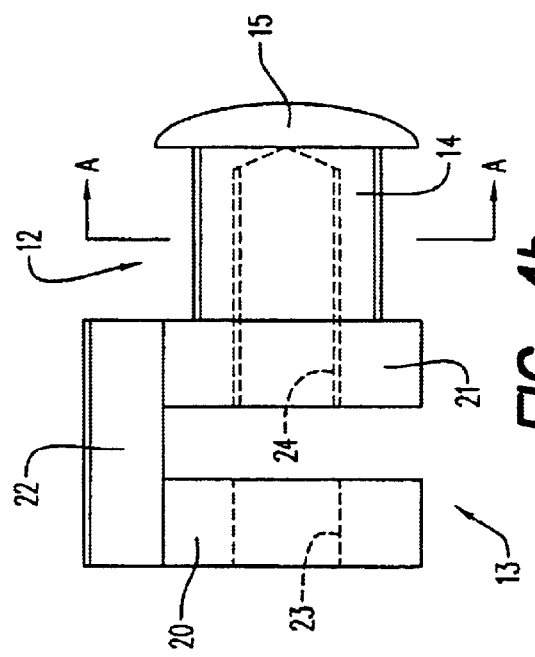
Figure 4A:
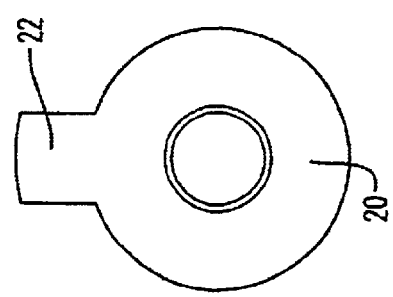

The hinge receiving aperture is shown in more detail in FIG. 3. It will be seen that the aperture is a little similar to a keyhole and is formed with a circular portion 9 that opens out towards the edge of the lens with outwardly sloping surfaces 10,11. FIGS. 4(a)–(c) show the hinge 8 in mode detail.

The hinge 8 is formed as an integral structure comprising a mounting body 12 and a hinge 13. Mounting body 12 comprises a central cylindrical core 14 that has a diameter equal to the diameter of the circular portion 9 of the aperture, and which has a length equal to the thickness of the lens. At one end of the body 12 is a head 15 of slightly enlarged diameter, and at the other end of the body 12 is integrally formed the hinge 13. The circumference or the core 14 is also provided with two sloping surfaces 16,17 that are complementary to the sloping surfaces 10,11 in the aperture.

It will thus be understood that the hinge 8 can securely be located in the aperture. The central core 14 is received within the circular portion 9 of the aperture, and surfaces 16,17 on the hinge 8 engage surfaces 10,11 formed as part of the aperture so as to prevent rotation of the hinge 8 within the aperture. Because of the fact that the length of the core 14 is equal to the thickness of the lens at the location of the aperture, and because the head 15 and hinge 13 are wider than the circular aperture 9, movement of, the hinge member is completely prevented.

The hinge structure itself is defined by a first circular member 20 that is parallel to and slightly spaced from a second circular member 21 formed at the end of the core member 14. The first and second circular members 20,21 and connected by connecting member 22 and define between them a space for receiving the end of the temple. Circular members 20,21 and the end of the temple are provided with screw holes 23,24 to allow a securing screw to hold the end of the temple in the hinge in a conventional manner.

With this structure the temple is capable of rotating about the hinge axis through 180° with the limits of the rotation corresponding to the positions shown in FIGS. 1 and 2. Movement of the temple beyond these points is prevented by lugs formed on the temple that contact the connecting member 22 to prevent further movement.

It will be understood from the above that the present invention, at least in its preferred forms, provides a hinge structure that can be fitted directly in the edge of a lens without requiring a separate hinge mounting to be fitted to the lens. The hinge allows 180° of movement and provides full functionality while minimizing the extent to which the hinge interferes with a wearer's vision.

What is claimed is:

1. An item of eyewear comprising two lenses and two rearwardly extending temple members, wherein each said temple member is pivotally mounted for movement between in-use and non-use positions by means of a hinge directly fitted in a notch-like aperture formed in a side edge of a respective said lens and having a hinge axis extending through said aperture.

2. An item of eyewear as claimed in claim 1 wherein said hinge axis is horizontal when the item of eyewear is being worn by a user.

3. An item of eyewear as claimed in claim 1 wherein said hinge axis extends substantially perpendicularly to the surface of the lens in the region of said hinge.

4. An item of eyewear as claimed in claim 1 wherein each said temple rotates about said hinge through 180° when moving between said in-use and non-use positions.

5. An item of eyewear as claimed in claim 1 wherein means are provided to fix said hinge in said aperture against rotation thereof.

6. An item of eyewear as claimed in claim 1 wherein said aperture comprises a first circular portion and two sloping edges connecting said circular portion to the edge of said lens, and wherein said hinge includes a mounting portion a central section thereof having a circular cross-section of the same diameter as said circular portion of said aperture, and said mounting portion further including sloping surfaces complementary to said sloping surfaces of said aperture whereby rotation of said mounting portion in said aperture is prevented.

* * * * *